US011070251B2

(12) United States Patent
Wendt

(10) Patent No.: US 11,070,251 B2
(45) Date of Patent: Jul. 20, 2021

(54) USB POWER DELIVERY CABLING FOR POWER FOCUSED APPLICATIONS

(71) Applicant: SIGNIFY HOLDING B.V., Eindhoven (NL)

(72) Inventor: Matthias Wendt, Eindhoven (NL)

(73) Assignee: SIGNIFY HOLDING B.V., Eindhoven (NL)

(*) Notice: Subject to any disclaimer, the term of this patent is extended or adjusted under 35 U.S.C. 154(b) by 0 days.

(21) Appl. No.: 16/623,458

(22) PCT Filed: Jun. 18, 2018

(86) PCT No.: PCT/EP2018/066123
§ 371 (c)(1),
(2) Date: Dec. 17, 2019

(87) PCT Pub. No.: WO2018/234242
PCT Pub. Date: Dec. 27, 2018

(65) Prior Publication Data
US 2020/0119768 A1 Apr. 16, 2020

(30) Foreign Application Priority Data
Jun. 22, 2017 (EP) .................................... 17177325

(51) Int. Cl.
*H04B 3/00* (2006.01)
*H04B 3/54* (2006.01)
(52) U.S. Cl.
CPC ....... *H04B 3/548* (2013.01); *H04B 2203/547* (2013.01)

(58) Field of Classification Search
CPC .............. H04B 3/548; H04B 2203/547; H04B 2203/5458
USPC ......................................................... 375/257
See application file for complete search history.

(56) References Cited

U.S. PATENT DOCUMENTS

| 10,405,405 B2* | 9/2019 | Wendt | F21S 2/005 |
| 2007/0049120 A1* | 3/2007 | Hemmah | H01R 13/665 |
| | | | 439/620.01 |
| 2014/0173141 A1* | 6/2014 | Waters | G06F 1/266 |
| | | | 710/16 |

(Continued)

FOREIGN PATENT DOCUMENTS

| CN | 101019087 B | 1/2013 |
| WO | 2016066371 A1 | 5/2016 |

*Primary Examiner* — Helene E Tayong

(57) ABSTRACT

The invention relates to a cable (12) and a male connector (10, 20) attachable to the cable (12) for transmission of power and data for use in power focused applications, in particular lighting applications. The male connector (10, 20) comprises a contact for power transmission (P), a contact for data communication (D) and optionally a contact for configuration signaling (C), wherein a conversion circuit (11, 21) is configured to translate the configuration signaling (C) to be transmitted via a single twisted pair of signaling wire together with the power transmission (P), and/or the data communication (D). Providing conversion circuitry within the connector allows to combine two or more signals received via respective connectors of the male connector and generate a combined signal to be transmitted over a single pair of twisted signal wire, the connector allows the usage of a cable with much higher flexibility.

9 Claims, 4 Drawing Sheets

(56) References Cited

U.S. PATENT DOCUMENTS

2014/0351622 A1 11/2014 Farrar et al.
2015/0268688 A1* 9/2015 Leinonen ............... H01R 13/70
　　　　　　　　　　　　　　　　　　　307/147
2016/0098222 A1 4/2016 Tsai et al.

* cited by examiner

USB POWER DELIVERY CABLING FOR POWER FOCUSED APPLICATIONS

CROSS-REFERENCE TO PRIOR APPLICATIONS

This application is the U.S. National Phase application under 35 U.S.C. § 371 of International Application No. PCT/EP2018/066123, filed on Jun. 18, 2018, which claims the benefit of European Patent Application No. 17177325.2, filed on Jun. 22, 2017. These applications are hereby incorporated by reference herein.

FIELD OF THE INVENTION

This invention relates to cabling using the new USB power delivery standard for power focused applications. More particularly, the present invention relates to a male connector attachable to a cable and a cable for transmission of power and data for use in power focused applications, in particular for lighting applications.

BACKGROUND OF THE INVENTION

USB-PD is a new version of the USB standard which introduces the new USB connector form factor USB-C. USB-C will be the future standard for USB connections. USB-C connectors are not only small compared to previous USB connectors and support up to USB3.1 data transfer speed, but they are also very rugged and symmetrical so that they fit in either direction. Finally, USB-C connectors have been designed to support power delivery to up to 100 W.

The USB-C female jacks are integrated in such diverse devices like chargers, battery packs, mobile devices, laptops, monitors and docking stations.

This new type of connector as well as some of the USB-PD features are very attractive for products of power focused applications, such as but not limited to the lighting industry. However, the definition of high data-rates and additional functionalities make the USB-C patch cables extremely costly. As they contain a high number of conductors they are also stiff and may thus do not provide the desired level of flexibility for being installed in for instance lighting applications. Finally, USBIF has limited the maximum cable length in order to guarantee the high data-rate and display-port functionality. Full feature USB-PD cables are thus relatively costly and usually overdesigned for power focused applications. Since power focused applications such as lighting applications often require long cable length to connection application devices, for instance throughout a building site, it would be desirable to provide improved connectors and cables for power focused applications.

WO 2016/066371 A1 discloses an apparatus and a method to use a power negotiation connection of a power delivery interface for transmitting or receiving control commands or, respectively, status information to/from a lighting device. The power negotiation connection can be used as a communication channel that is fully independent of the data connection, e.g., control commands, such as dim level or color, can be encoded in a vendor defined message of a related power negotiation protocol.

SUMMARY OF THE INVENTION

It is an object to provide improved connectors and cables for transmission of power and data for power focused applications.

The object is achieved by a (e.g. male) connector and a cable according to the independent claims.

According to an aspect of the invention a (e.g. male) connector attachable to a cable for transmission of power and data for use in power focused applications is provided. The male connector comprises a contact for power transmission, a contact for data communication and a conversion circuit configured to generate configuration signaling to be transmitted via a single twisted pair of signaling wire together with the power transmission, and/or the data communication.

Providing conversion circuitry within the connector allows to combine two or more signals and transmit the combined signal over a single pair of twisted signal wire. The connector thus allows the usage of a cable with high flexibility.

Configuration signaling refers to the signaling of power and voltage requests required by a connected application device and the subsequent negotiation signaling. The configuration signaling preferably uses USB-PD negotiation signals and the data communication preferably uses USB data signals according to the USB Power Delivery Specification Revision 3.0, Version 1.1, 12 Jan. 2017, as part of the Universal Serial Bus Specification Revision 3.1 by the USB Implementers Forum which is herewith incorporated by reference.

Preferably, the male connector is provided for transmission of power and data in a lighting application. In lighting applications only minimal data throughput will be required, if any at all, and most of the focus can be put on low losses in the cable and e.g. an increased cable length (e.g. 5 m or more). The trade-off will be made between losses and cable diameter and bending flexibility.

In an embodiment the male connector further comprises a contact for configuration signaling wherein the conversion circuit configured to generate configuration signaling comprises the conversion circuit being configured to decode and convert configuration signaling received via the contact for configuration signaling to be transmitted via a single twisted pair of signaling wire together with the power transmission, and/or the data communication. Preferably, the male connector complies with the USB-C form factor.

In an embodiment the conversion circuit comprises a configuration signaling circuitry to generate the configuration signaling based on predetermined parameters stored in a memory of the conversion circuit. In particular, if the connector does not comprise external contacts to receive configuration signaling, the conversion circuit might generate these signals based on preprogrammed parameters, wherein the preprogramming may be performed during manufacturing, commissioning or operation. For instance, if the connector is connected to a load, the configuration signaling circuitry may determine the power requirements of the load, e.g. by identifying a signature, type, etc. or receiving a request via the data communication contact. The configuration signaling circuitry may then generate appropriate control signaling to negotiate power requirements on behalf of the load.

Preferably, the conversion circuit further comprises a hub to generate a combined signal from the data communication with the configuration signaling received from the configuration signaling circuitry. The combined signal from the hub may then preferably be transmitted via a single twisted pair of signaling wire. The power transmission is provided via a second twisted pair of signaling wire. Thus, in this embodiment the required cable comprises at least a double twisted pair cable to provide a higher data rate.

In an alternative embodiment the conversion circuit comprises a configuration signaling circuitry to generate the configuration signaling or decode and convert a received configuration signaling and preferably a modulator to generate a high frequency signal from the configuration signaling received from the configuration signaling circuitry. Preferably, the conversion circuit comprises a filter unit to combine the high frequency signal received from the modulator with the power transmission to be transmitted on a single twisted pair of signaling wire. The data communication is provided via a second twisted pair of signaling wire. Thus, also in this embodiment the required cable comprises at least a double twisted pair cable to provide a higher data rate.

In a further embodiment there is provided a configuration signaling circuitry to generate the configuration signaling or decode and convert a configuration signaling received via a contact for control signaling and preferably a hub to generate a combined signal from the data communication with the decoded configuration signaling received from the configuration signaling circuitry and a modulator to generate a high frequency signal from the combined signal received from the hub. Preferably, the conversion circuit comprises a filter unit to combine the high frequency signal received from the modulator with the power transmission to be transmitted on a single twisted pair of signaling wire.

In an embodiment the conversion circuit comprises a local power supply regulator.

In an embodiment the conversion circuit is further configured to extract configuration signaling from a transmission received from a single twisted pair of signaling wire, wherein the transmission comprises the configuration signaling together with the power transmission and/or the data communication. In this embodiment the conversion circuit provides conversion functionality from a plurality of signals to at least one combined signal and from at least one combined signal to a plurality of signals. The conversion circuit is enabled to provide symmetrical translation functionality such that the translation of signals received via one or more twisted pair cables to the respective output contacts is the inverse of the translation of respective input signals received via the contacts to the output provided to the twisted pair cables. In this case only one conversion circuit is provided in the respective connectors to provide unidirectional transmissions.

According to an aspect of the invention a male connector attachable to a cable for transmission of power and data for use in power focused applications is provided, comprising a contact for power transmission and a contact for data communication and a conversion circuit configured to extract configuration signaling from a transmission received from a single twisted pair of signaling wire, wherein the transmission comprises the configuration signaling together with the power transmission, and/or the data communication.

In an embodiment, the connector further comprises a contact for control signaling. If the transmission comprises the configuration signaling together with the power transmission and the data communication, the conversion circuit is further configured to extract the power transmission and the data communication from the transmission received from the single twisted cable.

According to a further aspect of the invention a cable for transmission of power and data for use in power focused applications is provided, comprising a first male connector according to claims 1 to 10 on one side of the cable and a second male connector according to any of the claims 10 to 13 on the other side of the cable, wherein the cable comprises only one twisted pair of wires for communication of configuration signaling together with the power transmission and/or the data communication. Depending on the required transmission direction both ends may be provided with conversions circuitry providing both conversion directions or if appropriate only a single conversion direction.

Preferably, the cable provides symmetric functionality and the male connectors are formed according to the form factor USB-C. In such a case a user does not have to pay attention as to the cabling direction. Alternatively, at least one of the male connectors may also be formed according to another USB form factor or according to a load specific design with or without configuration signaling contact.

It shall be understood that the male connector of claim 1, the male connector of claim 11, and the cable of claim 13, have similar and/or identical preferred embodiments, in particular, as defined in the dependent claims.

It shall be understood that a preferred embodiment of the present invention can also be any combination of the dependent claims or above embodiments with the respective independent claim.

These and other aspects of the invention will be apparent from and elucidated with reference to the embodiments described hereinafter.

DETAILED DESCRIPTION OF EMBODIMENTS

Figure 1A:
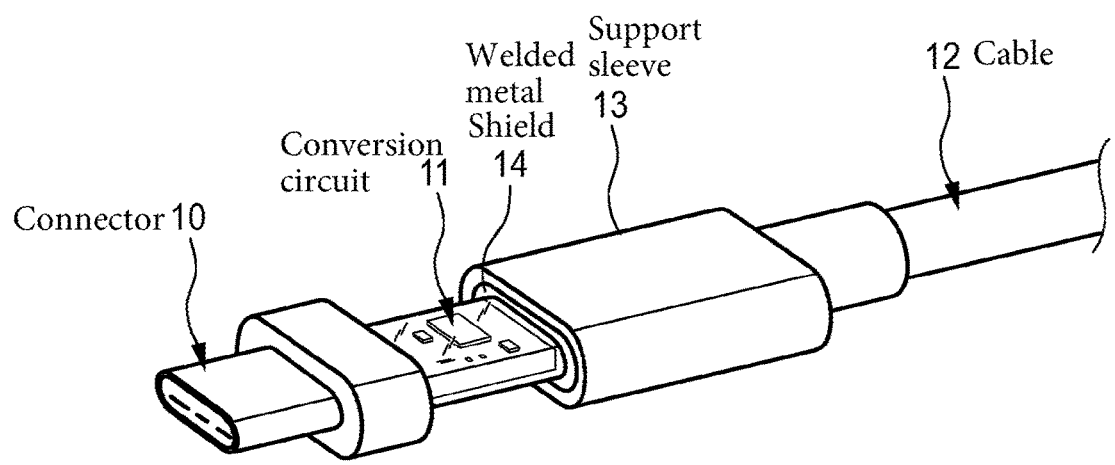
FIGS. 1A and 1B exemplary and schematically show a male connector according to an embodiment of the present invention.

FIG. 1A exemplary and schematically shows a male connector according to an embodiment of the present invention. The connector 10 according to this embodiment has a shape according to the USB-C form factor. A USB-C connector is compact, rugged and supports up to 100 W. The connector is flipable because the pin definitions are symmetrically mirrored to allow plug insertion in either direction. The USB-C pin layout according to the Universal Serial Bus Type-C Cable and Connector Specification, Revision 1.2, 25 Mar. 2016 which is part of the USB Power Delivery Specification Revision 3.0, Version 1.1 released, 12 Jan. 2017 by the USB Implementers Forum, defines five distinct sections. One data pair is for USB2.0, two high speed data pairs for USB3.x, the bus power, sideband use pins SBU1/2 are not used in USB mode, and configuration channel pins CC1/2 are used for USB-PD related communication as well as for busmode and insertion direction detection. On the other side the connector is attachable to a cable 12, wherein the cable may comprise one or more twisted pair cable, e.g. as described in the standards IEEE802.3bu and 802.3 bp which are herewith incorporated by reference.

Figure 1B:
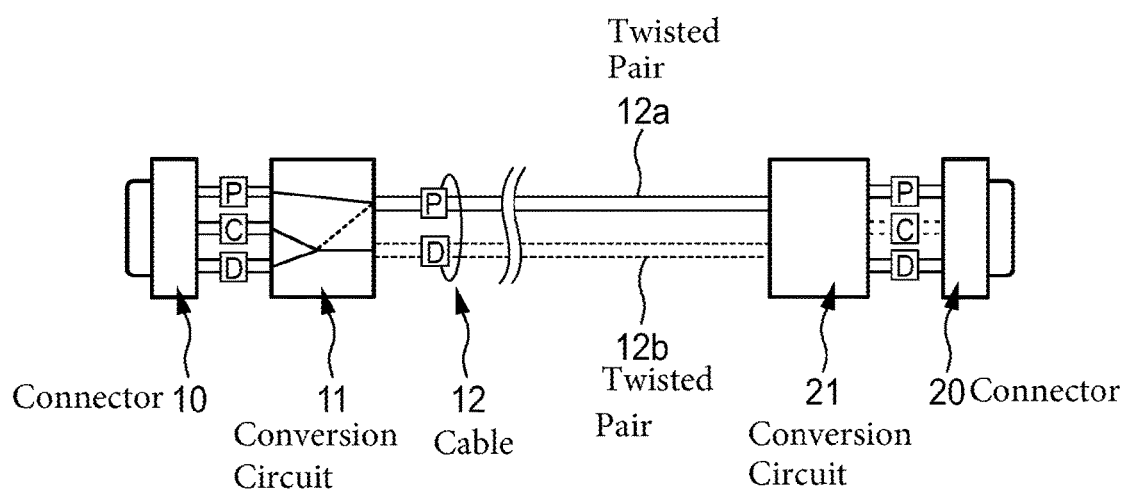

The connector 10 comprises a support sleeve 13, preferably made of polycarbonate to cover a circuit board comprising a conversion circuit 11. Preferably, the circuit board and the conversion circuit on it are protected by a precision welded metal shield 14 which is crimped around the circuit board. Wherein common USB-PD cables for high-speed data transmission usually comprise a plurality of cable wires, inter alia for power transmission, data transmission, control signaling, etc., the cable 12 comprises only a reduced number of cable wires, e.g. either a single twisted pair or a double twisted pair cable to transmit power P and data D/control C information as indicated in FIG. 1B. Wherein the conversion circuit 11 receives inter alia power transmission P, optionally configuration signaling C and data communication D as input, the output of the conversion circuits 11 is reduced to a single twisted pair, indicated with P in FIG. 1B or optionally a second twisted pair, indicated with the dashed line labeled D in FIG. 1B. The provision of contacts for control signaling is optional. USB-C connectors provide such contacts. However, the control signaling can also be generated by the conversion circuitry 11 provided in the connector to handle power negotiations on behalf of a connected load. Accordingly, the conversion circuitry 11 integrated with the connector 10 is able to do the USB-PD negotiation locally or transfer, e.g. receive, decode, translate, the configuration signaling C needed for power negotiation with a powered device and add it either to the data communication D or modulated on the power transmission P. In a single twisted pair cable implementation even the data signal wires are removed from the cable and all information C+D is transferred using powerline communication on the power transmission line P. The conversion circuitry may be preprogrammed during manufacturing or commissioning. It may also be (re)programmed during operation. For instance, for a USB3 compatible power request signaling (by means of signals CC1 and CC2) the power parameters may be programmed to the conversion circuitry, e.g. fixed to sinking 5V and 1 A. The other side of the cable could be equipped with any of the USB appliance connectors like micro or mini USB or an application specific connector, which do not provide for the configuration signaling. For such connectors, the conversion circuitry facilitates the generation of configuration signaling.

At the other end of the cable 12 there is again a male connector 20 also comprising a conversion circuit 21 which is adapted to perform the inverse conversion from the signal or signals received via the respective twisted pair cables labeled P and optionally D to extract the respective output signals, the power transmission P, the configuration signaling C and the data communication D. Preferably, the conversion circuits 11 and 21 have the same structure, and thus preferably allow the translation of signals in both directions which allows bidirectional signal conversion. For instance, if both cable ends are equipped with USB-C connectors, then there is the possibility of bidirectional powerflow. The coding and decoding of the configuration signaling should be fully symmetric in order to give users full flexibility in which direction the cable is used. In that case, the user does not have to pay attention as to the cabling direction. However, there might be applications in which a unidirectional powerflow is sufficient or even favorable. Then, the circuitry may be reduced to provide such unidirectional powerflow and the corresponding control signaling. For example, when one side of the cable is a Hostside USB connector, e.g. fitting in the socket in a computer, or an appliance side USB connector, e.g. fitting into a mobile device like a smartphone, this automatically sets the possible power flow direction. Hence, there is no need for symmetrical processing of the configuration signaling. However, the dataflow is still symmetric. The conversion circuits on both side may then differ in their functionality. The second connector 20 may also have any other appropriate design, either complying with any other USB form factor or with an application specific plug compliant with the signal received via the single or optionally double twisted pair.

Figure 2:
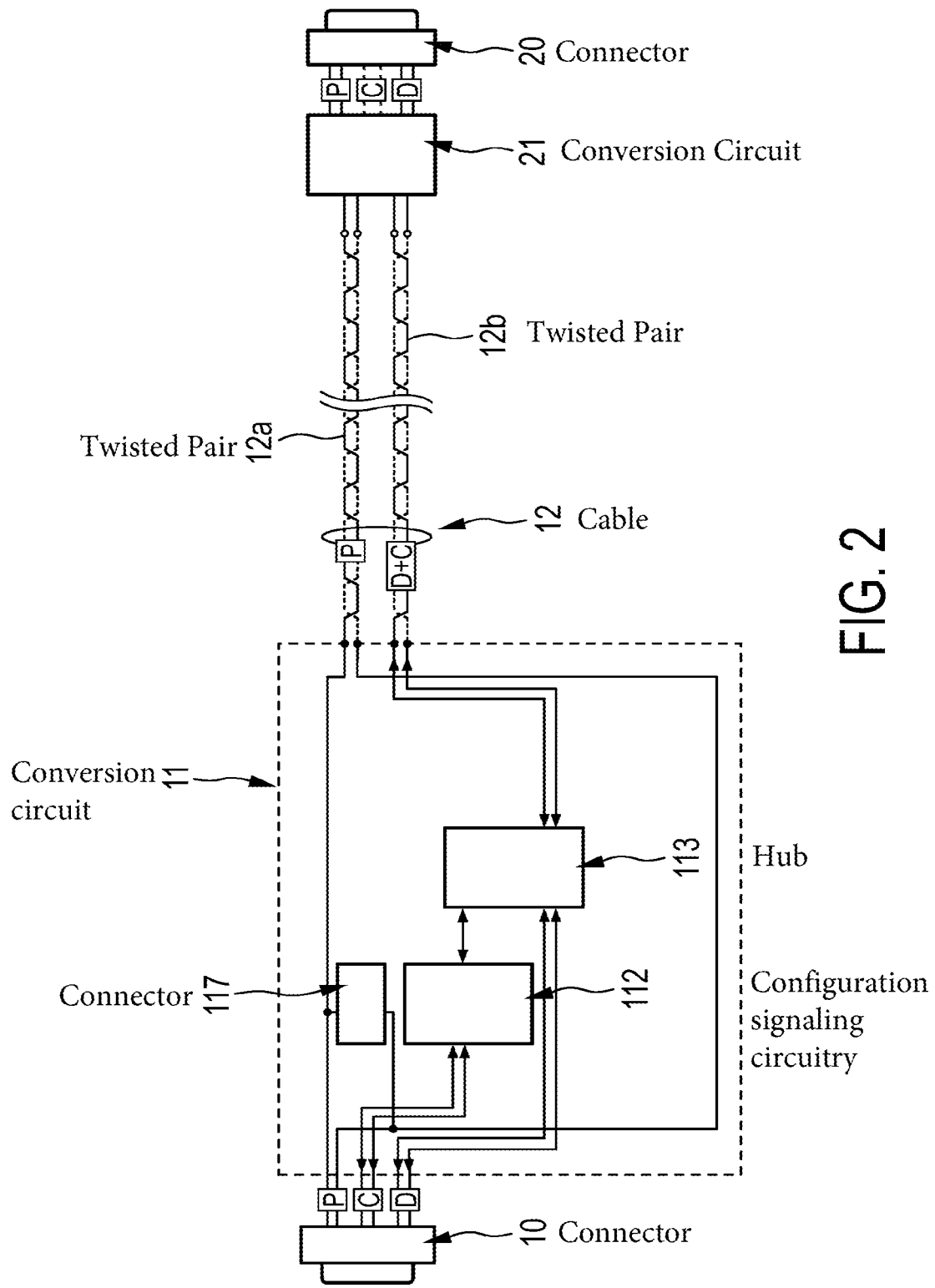
FIG. 2 exemplary and schematically shows a first version of the conversion circuit of a male connector according to an embodiment of the present invention.

FIG. 2 exemplary and schematically shows a first version of the conversion circuit of a male connector according to an embodiment of the present invention. As described in connection with FIG. 1, power transmission P, data communication D and optionally configuration signaling C are received via the contact pins of the male connector 10. The circuitry 11 may identify itself as USB3.x connection using the appropriate contacts of a USB-C jack or only a 2.x connection using the central data pair contacts. In USB3 the data channel is two data pairs and the power limits are higher. The cable may identify as a valid USB3 cable, e.g. to get the extended power range, and still use only one data pair in the cable for the transmission. Thus, the total data rate will be reduced against expectations of USB3. In applications which focus on power rather than data, this might be advantageous. The conversion circuit 11 comprises configuration signaling circuitry 112 which decodes the configuration signaling C received via the respective contacts. If the connector does not provide contacts for control signaling, the configuration signaling circuitry 112 may generate these signals, e.g. CC1 and CC2 defined for USB-PD control signaling. The parameters to generate the control signaling may be preprogrammed and stored in the conversion circuitry, e.g. in a memory. They may be preprogrammed during manufacturing or commissioning. There may be a plurality of parameters stored and associated with respective device types, such that upon connection with a load, the load may identify itself and the configuration signaling circuitry 112 may determine the respective parameters to generate the control signaling C. Configuration signaling circuitry 112 further translates the decoded or generated configuration signaling C into a format compliant with the data communication D. Both, the output of configuration signaling circuitry 112 and the data communication D are input into hub 113 which combines the data communication D, e.g. USB communication data flow, with the information related to the USB-PD management. The output C+D of hub 113 is transmitted via a twisted pair 12b along a second twisted pair 12a used for the power transmission P. The conversion circuit 11 optionally comprises a power supply regulator 117 which supplies all the circuitry with power.

Figure 3:
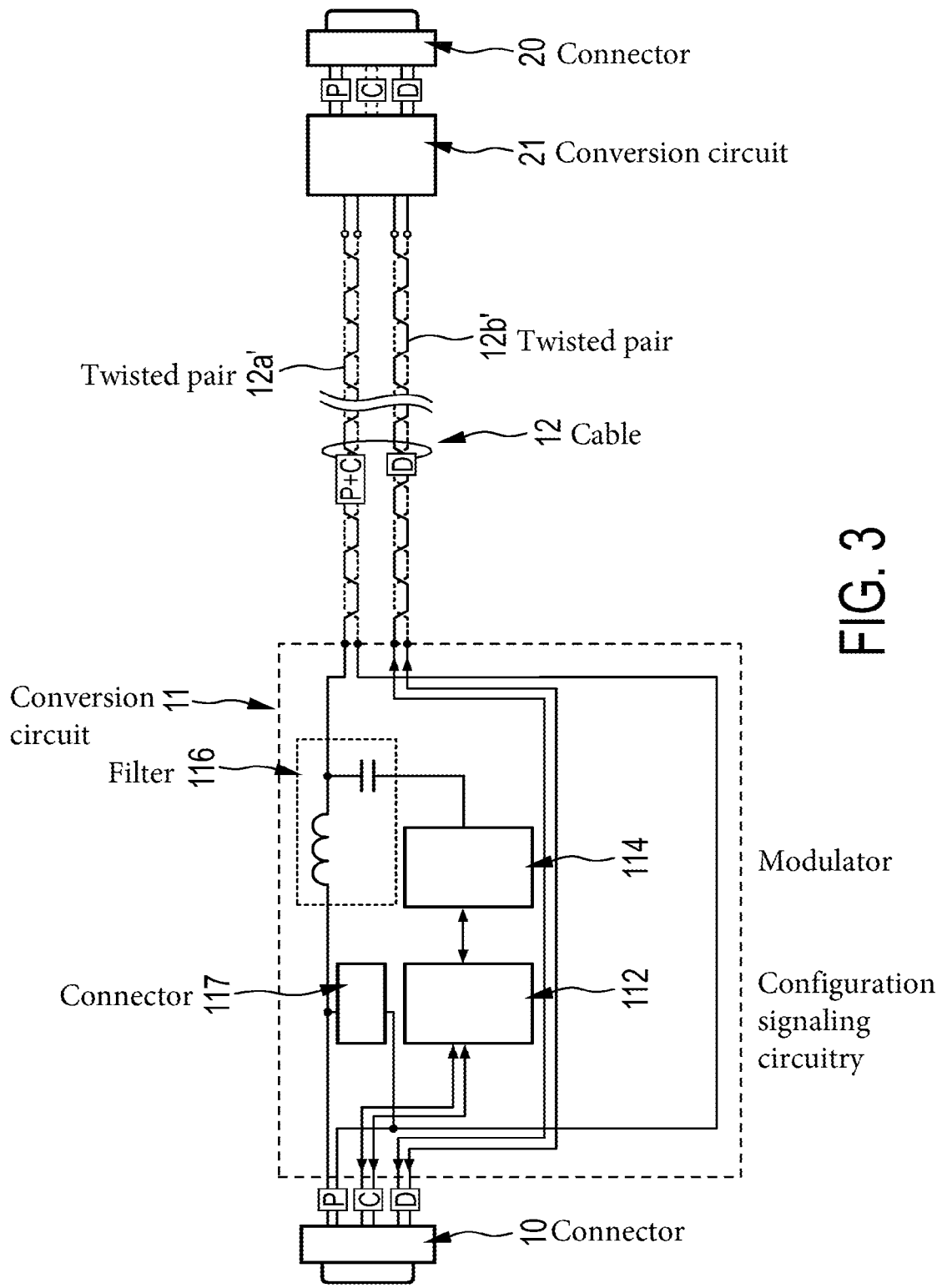
FIG. 3 exemplary and schematically shows a second version of the conversion circuit of a male connector according to an embodiment of the present invention.

FIG. 3 exemplary and schematically shows a second version of the conversion circuit of male connector according to an embodiment of the present invention. The conversion circuits 11 differs from the conversion the circuits according to the version shown in FIG. 2 in that the configuration signaling C is powerline modulated onto the power transmission to be transmitted via the power transmission cable. In order to achieve that, the output of configuration signaling circuitry 112 is provided to modulator 114 which generates a high-frequency signal from the decoded configuration signaling C. This high-frequency signal is combined with the power transmission P via filter unit 116 comprising a capacitor and an inductor. The inductor is used to only conduct the DC component for the power transmission and the capacitor is conducting the high frequency content as used for data transmission. Both components ensure that no unintentional RF or DC flow occurs. Wherein the data communication is transmitted via one twisted pair cable 12b', the power transmission P and configuration signaling C information is transmitted to a respective connector 20 at the other end of the cable via twisted pair cable 12a'.

Figure 4:
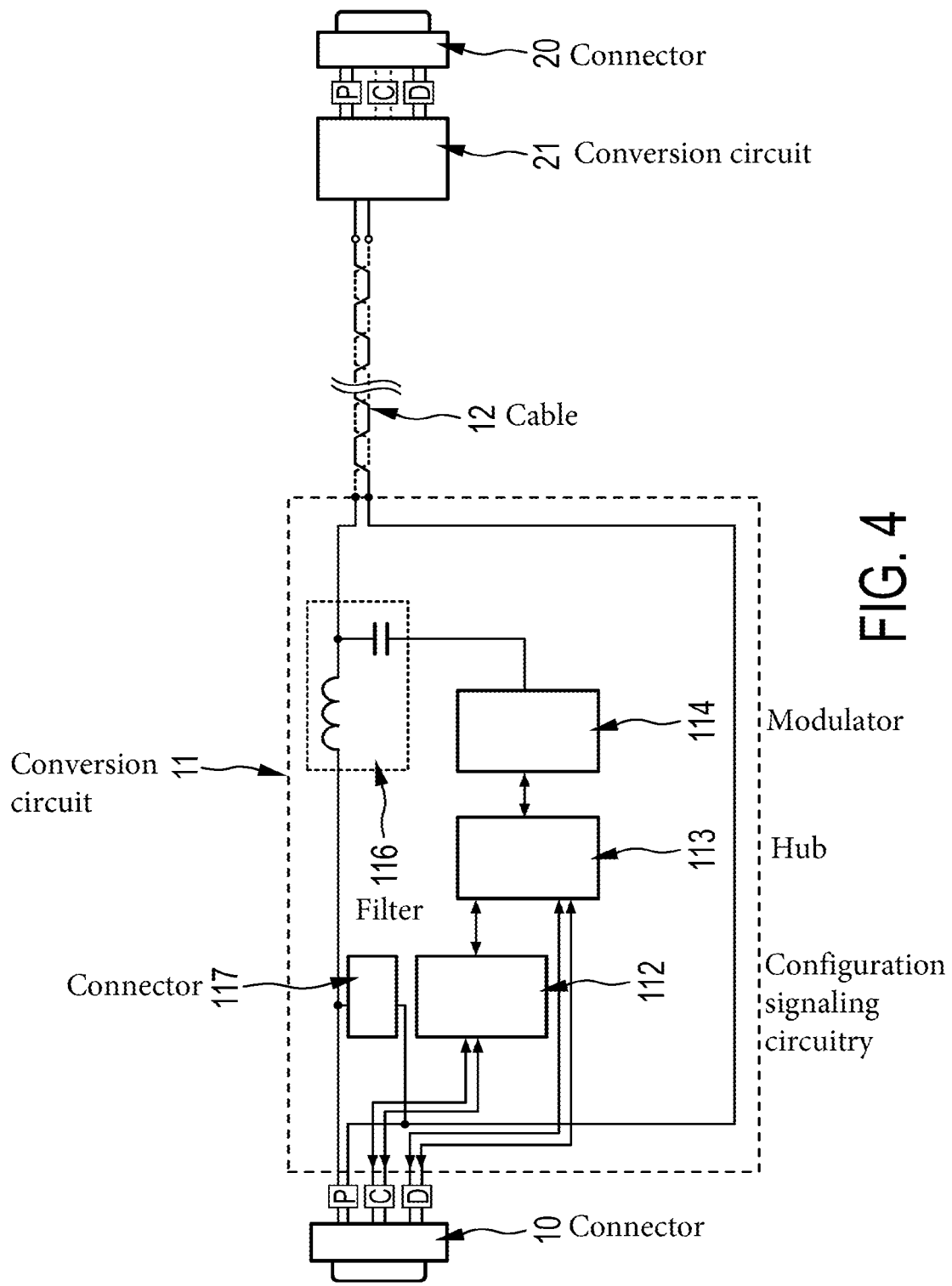
FIG. 4 exemplary and schematically shows a third version of the conversion circuit of a male connector according to an embodiment of the present invention.

FIG. 4 exemplary and schematically shows a third version of the conversion circuit of a male connector according to an embodiment of the present invention. In this version of an embodiment of the present invention only a single twisted pair of signaling wire is used to transmit power P, data D and signaling information C. The conversion circuit 11 comprises the combined circuitry of the embodiments depicted in FIGS. 2 and 3. The output of configuration signaling circuitry 112 is provided to hub 113, where it is combined with the data communication D. The combined output is received by modulator 114 which generates a high-frequency signal from the combined signal. This high-frequency signal is combined with the power transmission P via filter unit 116 comprising a capacitor and an inductor for the same reason as explained above for FIG. 3.

In this embodiment the information about voltage and power request, e.g. the configuration signaling C, is transferred by means of powerline communication on the power conductors P of the cable 12. This cable 12 only comprises one twisted pair optimized for power delivery at high efficiency. It also supports data communication D by choosing appropriate isolation so as to allow reliable data and power transmission over a single twisted pair as e.g. described in the standards IEEE802.3bu and 802.3 bp.

For all implementations shown in FIGS. 1B, 2, 3 and 4 only one of the connector sides could be of type USB-C and the other could be either one of the other USB connectors or a load specific connector. The negotiation parameters for power negotiations could be preprogrammed in the connector integrated circuitry, e.g. at manufacturing time, at installation or commissioning or during operation. If one of the connectors does not provide control signaling contacts, the conversion circuitry may generate the respective control signaling for power negotiations. Preferably, the parameters for negotiation can be programmed and stored in the conversion circuitry. Multiple ways may be used to do this programming e.g. through a dedicated USB communication a programmer in the factory could do that. Or the load may be able to check the negotiation programming and change it, if required. For instance, upon a first negotiation cycle initiated by the load, the conversion circuitry could store the negotiation parameters and initiate the negotiations at a later time, e.g. after restart on behalf of the load. Also in cases where both sides of a cable are provided with control signaling contact, e.g. USB C connector, it may be beneficial to have a preprogrammed negotiation in the conversion circuits. For long cables the transmission of negotiation signals in real time might not be an optimal solutions due to the time shift introduced by the cable length. So in applications with long cables the two connectors could initially exchange what the connected devices on either side are negotiating and store that information locally as long as the connectors do not get extracted. A first learning cycle the control signaling can then be performed immediately after a restart without any preparation or sometimes even without a trigger from the device. The connectors can perform the control negotiation on behalf of the devices.

While the invention has been illustrated and described in detail in the drawings and foregoing description, such illustration and description are to be considered illustrative or exemplary and not restrictive; the invention is not limited to the disclosed embodiments. Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measures cannot be used to advantage. Any reference signs in the claims should not be construed as limiting the scope.

The invention claimed is:

1. A connector attachable to a cable for transmission of power and data for use in power focused applications comprising:
    a contact for power transmission,
    a contact for data communication, and
    a conversion circuit configured to generate configuration signaling to be transmitted via a single twisted pair of signaling wire together with the power transmission, and the data communication and the connector further comprising a contact for configuration signaling wherein the conversion circuit configured to generate configuration signaling comprises the conversion circuit being configured to decode and convert configuration signaling received via the contact for configuration signaling to be transmitted via the single twisted pair of signaling wire together with the power transmission, and the data communication; and
    wherein the conversion circuit comprises a modulator to generate a high frequency signal from the decoded configuration signaling received from the configuration signaling circuitry.

2. The connector according to claim 1, wherein the conversion circuit comprises a configuration signaling circuitry to generate the configuration signaling based on predetermined parameters stored in a memory of the conversion circuit.

3. The connector according to claim 1, wherein the conversion circuit comprises a local power supply regulator.

4. A connector attachable to a cable for transmission of power and data for use in power focused applications comprising:
    a contact for power transmission,
    a contact for data communication, and
    a conversion circuit configured to generate configuration signaling to be transmitted via a single twisted pair of signaling wire together with the power transmission, and the data communication and the connector further comprising a contact for configuration signaling wherein the conversion circuit configured to generate configuration signaling comprises the conversion circuit being configured to decode and convert configuration signaling received via the contact for configuration signaling to be transmitted via the single twisted pair of signaling wire together with the power transmission, and the data communication, wherein the conversion circuit comprises a hub to generate a combined signal from the data communication with the configuration signaling received from the configuration signaling circuitry; and
    wherein the conversion circuit comprises a modulator to generate a high frequency signal from the combined signal received from the hub.

5. The connector according to claim 4, wherein the combined signal from the hub is transmitted via the single twisted pair of signaling wire.

6. The connector according to claim 4, wherein the conversion circuit comprises a filter circuit to combine the high frequency signal received from the modulator with the power transmission to be transmitted on the single twisted pair of signaling wire.

7. A connector attachable to a cable for transmission of power and data for use in power focused applications comprising:
   a contact for power transmission,
   a contact for data communication, and
   a conversion circuit configured to generate configuration signaling to be transmitted via a single twisted pair of signaling wire together with the power transmission, and the data communication and the connector further comprising a contact for configuration signaling wherein the conversion circuit configured to generate configuration signaling comprises the conversion circuit being configured to decode and convert configuration signaling received via the contact for configuration signaling to be transmitted via the single twisted pair of signaling wire together with the power transmission, and the data communication, wherein the conversion circuit is further configured to extract configuration signaling from a transmission received from the single twisted pair of signaling wire, wherein the transmission comprises the configuration signaling together with the power transmission, and the data communication.

8. The connector according to claim 7, wherein the transmission comprises the configuration signaling together with the power transmission and the data communication and the conversion circuit is further configured to extract the power transmission and the data communication from the transmission received from the single twisted cable.

9. A cable for transmission of power and data for use in power focused applications, comprising:
   a first connector according to claim 1 on one side of the cable, wherein the cable comprises only one twisted pair of wires for communication of configuration signaling together with the power transmission, and/or the data communication.

* * * * *